United States Patent
Chen et al.

(10) Patent No.: US 7,103,786 B2
(45) Date of Patent: Sep. 5, 2006

(54) METHOD OF PORTABLE COMPUTER POWER MANAGEMENT USING KEYBOARD CONTROLLER IN DETECTION CIRCUIT

(75) Inventors: Chih-Hsien Chen, Taipei (TW); Chi-Cheng Kuo, Taoyuan Hsien (TW); John Chien, Chungli (TW); Chien-Yeh Chen, Panchiao (TW)

(73) Assignee: Uniwill Computer Corp., Chungli (TW)

( * ) Notice: Subject to any disclaimer, the term of this patent is extended or adjusted under 35 U.S.C. 154(b) by 557 days.

(21) Appl. No.: 10/322,547

(22) Filed: Dec. 19, 2002

(65) Prior Publication Data

US 2004/0078606 A1    Apr. 22, 2004

(30) Foreign Application Priority Data

Oct. 17, 2002    (TW) ................. 091123888

(51) Int. Cl.
*G06F 1/32* (2006.01)
(52) U.S. Cl. .................................. 713/320
(58) Field of Classification Search ............ 713/320
See application file for complete search history.

(56) References Cited

U.S. PATENT DOCUMENTS

| | | | | |
|---|---|---|---|---|
| 5,974,556 A | * | 10/1999 | Jackson et al. ............ | 713/322 |
| 5,996,084 A | * | 11/1999 | Watts ......................... | 713/323 |
| 6,118,306 A | * | 9/2000 | Orton et al. ................ | 327/44 |
| 6,266,776 B1 | * | 7/2001 | Sakai .......................... | 713/300 |
| 6,418,535 B1 | * | 7/2002 | Kulakowski et al. ....... | 713/320 |
| 6,675,304 B1 | * | 1/2004 | Pole et al. .................. | 713/322 |
| 6,704,879 B1 | * | 3/2004 | Parrish ....................... | 713/322 |
| 6,763,478 B1 | * | 7/2004 | Bui ............................. | 713/600 |
| 6,785,829 B1 | * | 8/2004 | George et al. ............. | 713/320 |
| 6,829,713 B1 | * | 12/2004 | Cooper et al. ............. | 713/320 |
| 6,941,480 B1 | * | 9/2005 | Dai ............................. | 713/320 |
| 2004/0073821 A1 | * | 4/2004 | Naveh et al. .............. | 713/320 |

* cited by examiner

*Primary Examiner*—Chun Cao
(74) *Attorney, Agent, or Firm*—Alan D. Kamrath; Nikolai & Mersereau, P.A.

(57) ABSTRACT

The present invention relates to a power management method of portable computer and detects the electric power consumption of portable computer through a detection circuit during the operation of portable computer, in addition, dynamically changes any one of the followings: the voltage and frequency of portable computer CPU, the frequency and efficacy of Video Graphics Array (VGA), or the frequency of memory. What is more, the invention provides a plurality of power management modes of portable computer for achieving the object of managing electric power consumption of portable computer.

16 Claims, 6 Drawing Sheets

METHOD OF PORTABLE COMPUTER POWER MANAGEMENT USING KEYBOARD CONTROLLER IN DETECTION CIRCUIT

BACKGROUND OF THE INVENTION (1) Field of the Invention

The present invention relates to a method of managing electric power consumption, and more particular to a method that is applied to working power supply of a portable computer.

(2) Description of Prior Art

To seek for better working efficacy of portable computer of the present day, the operating speed and capability of mobile CPU, which is particularly used for portable computer, has been enhanced, therefore, power consumption of mobile CPU is relatively increased, and further causes higher heat to computer. Hence, both Intel and Microsoft have provided excellent electric power management for mobile CPU of portable computer, such as Advanced Configuration and Power Interface (ACPI) and Speed step. ACPI has defined five states from C0~C4, the higher states have better efficacy of the electric power management. However, mobile CPU of portable computer still has some drawbacks, e.g., the newly promoted mobile CPU speed of portable computer on the market always falls behind DESK TOP CPU of Desktop PC at three to six months, but its selling price is higher than Desktop PC; the production cost, therefore, can not be reduced.

Seeing that mobile CPU of portable computer causes higher cost, the production lines of many portable computer manufacturers have focused on producing DESK TOP CPU of Desktop PC for replacing mobile CPU of portable computer. Consequently, two kinds of CPUs, DESK TOP CPU and mobile CPU, for portable computers are generated; nevertheless, the reserved mobile CPU for the use of portable computer is able to support Speed step and states C0 to C4 to achieve effective electric power management; whereas DESK TOP CPU of Desktop PC can not support Speed step, in addition, the ACPI thereof can support state C2 only.

Besides, DESK TOP CPU of Desktop PC at P4 2.4 GHz/533 has to consume 10 W of electric power only during the period of idle mode; furthermore, CPU at 2.6 GHz/2.8 GHz at least consumes 15 W of electric power during the period of idle mode. Therefore, it is hard to imagine how many batteries are required for operating a portable computer over two hours at the battery mode.

Seeing that the requirement of information processing devices with the mobility quality in modern society is increasing, the goal of unceasingly producing lighter and smaller portable computer will definitely result in the gradual decrease of portable computer in the future to become a production trend. Nevertheless, considering that a mobile worker operates his/her portable computer in an environment where is not necessary to equip with electric power, hence, each portable computer has a built-in battery for supplying required electric power for peripheral computer apparatus, such as a monitor, a disc, a keyboard and a mouse, etc. However, the built-in battery can not supply with required electric power for a portable computer in a long time.

Inasmuch as there is nothing to do with electric power replenishment with the poor progress of battery capability, how to manage electric power consumption of portable computer, which applies DESK TOP CPU of Desktop PC, in addition, effectively prolong the time of battery usage have become technique subjects to be solved.

SUMMARY OF THE INVENTION

In view of the foregoing descriptions, the invention provides a power management method of portable computer in order to dynamically tune up voltage and frequency of portable computer, in addition, keep the normal working of the portable computer. The components for adjustment are the External Clock and voltage of CPU, frequency of memory, or frequency and efficacy of Video Graphics Array (VGA) card.

The invention provides a detection mechanism, a basic system structure and a plurality of power management modes. When portable computer is operating, the detection circuit detects the electric power consumption of portable computer, the electric current statuses of charge adapter and battery output, or the CPU utilization. Once a portable computer enters any particular event, the power management modes of the invention can be used for adjusting that portable computer, so as to achieve the object of electric power management of portable computer.

Besides, the method of the invention is able to simulate the functions of supporting Speed step and states C3 and C4 using DESK TOP CPU of Desktop PC to enable the system enters into state C2 first. However, as state C2 is easily interrupted by many events of the system, the invention, therefore, enables the system to carry out the regulation of voltage and frequency maintaining the system at state C2 without support by other hardware.

Moreover, seeing that portable computer is usually under a non-charge status, the computer system always provides a power management mode for enabling portable computer to be at a mode that is defined and transformed by the system, which, then, need not keep up the status of the maximum function to cause excessive electric power consumption. Under the said principle and in accordance with the safety spec. requirement, the invention also considers the protection to safety spec., e.g., the system temperature, electric power, etc., so that the invention enables any user to operate portable computer at ease and properly adjust the function setup of his/her portable computer as wishes.

The disclosed method of the invention at least comprises the following steps: detecting portable computer through a detection mechanism, compelling portable computer to enter a particular status, dynamically modifying a condition that is required by the portable computer under the particular status, at last, enabling portable computer to check out from the particular status.

To enable a further understanding of the objective, structural features and function of the present invention, the detailed descriptions of the preferred embodiments are followed by the brief descriptions of the drawings below.

DETAILED DESCRIPTION OF THE PREFERRED EMBODYMENTS

The invention is a power management method of portable computer, focusing on CPU (desktop PC, DESK TOP CPU) with two sections, one is to dynamically adjust the voltage and frequency of CPU 30 through the system; the other is to adjust the electric power level of CPU 30 based on the load status of CPU 30. Seeing that the goal of the invention mainly focuses on applying CPU 30 of desktop PC to portable computer, supports states C3 and C4 that are proposed by Advanced Configuration and Power Interface (ACPI), and then prolongs the time for battery usage, the invention develops a method, which can dynamically change the voltage and frequency of CPU 30.

Figure 1:
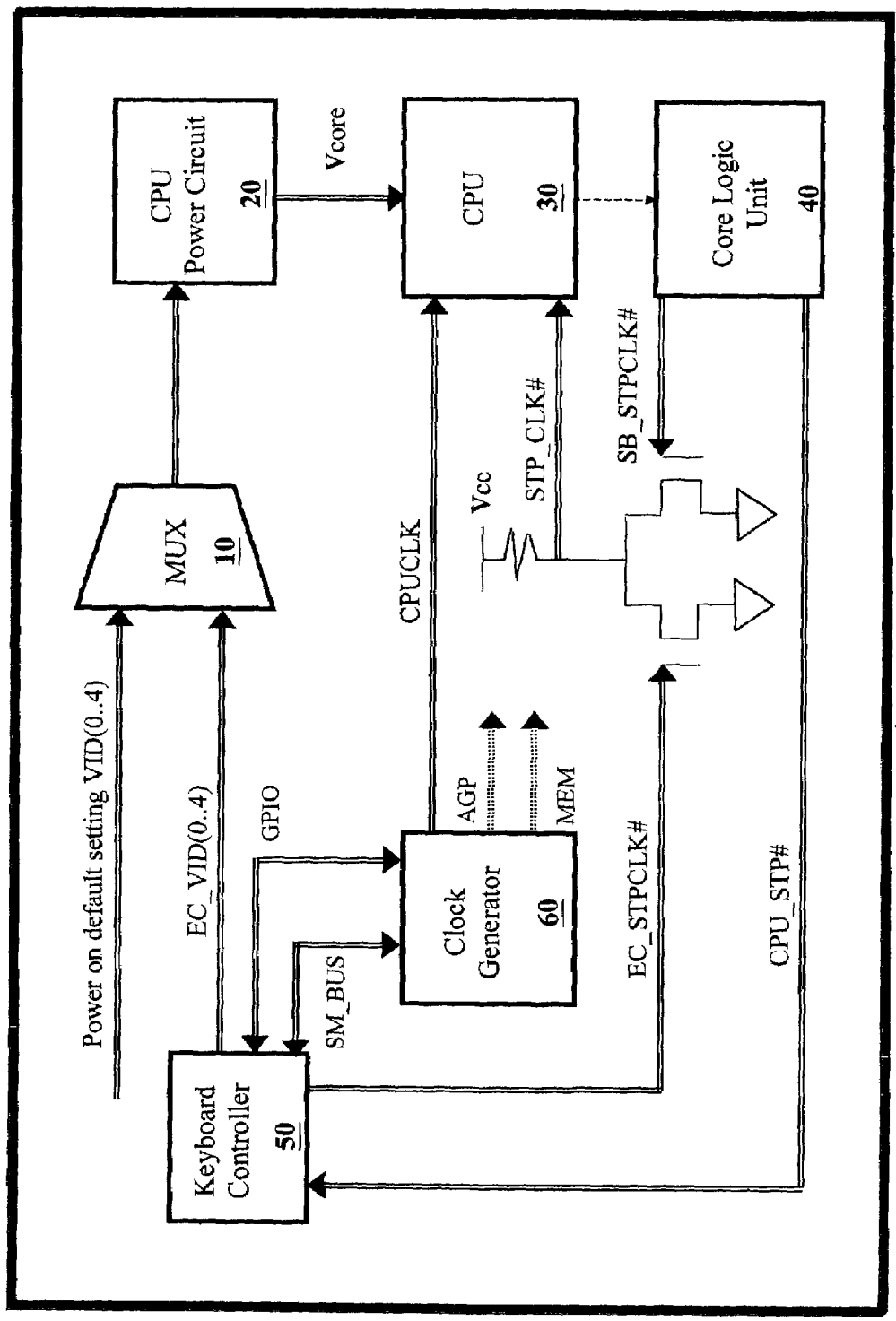
FIG. 1 is a systematic block diagram of the power management method of portable computer according to the invention.

Prior to the introduction of the method of the invention, the basic system of the invention is depicted herein referring to FIG. 1, the systematic block diagram of the power management method of portable computer of the invention. The invention system comprises several units as follows,

- a Multiplex (MUX) 10, as shown in the drawing, can be set through Voltage Identification (VID) for CPU power circuit 20, e.g., the setup of VID (0.4). The VID is adjusted by a defaulted core voltage (Vcore) through a keyboard controller 50;
- a CPU power circuit 20, which handles the output management of core electric power of the system to CPU 30;
- a CPU 30, which handles arithmetic and logic algorithms of portable computer and defines the meaning of each command, and might include cache memory, which contains the storage of the latest and frequently used data. In the meanwhile, CPU 30 also controls most of the components of the computer system;
- a core logic unit 40, which at least supports states C2 and C3 that are proposed by a ACPI;
- a keyboard controller 50, which can access System Management Bus (SM Bus) and is able to program General Purpose Input Output (GPIO).

The aforementioned units can communicate and link to one another through signals shown in the diagram.

With the said system, the voltage and frequency of CPU can be adjusted, but when? Subsequently, the circuit detection is further described as follows referring to FIG. 2, the circuit diagram of the detection mechanism of the power management method of portable computer according to the invention.

The drawing is the basic circuit diagram of the detection mechanism, though there are many detection methods. As the invention mainly emphasizes on the method of electric power management, the basic circuit diagram is roughly introduced herein.

The detection mechanism provides circuits like: a sense register 80, an amplifier 70 and a keyboard controller 50.

The sense register 80 is set in the CPU power circuit 20 for inducing the electric current load of CPU 30 and sending out an electric current signal;

The amplifier 70 enlarges voltage drop in between both ends of the sense register 80; therefore, when an electric current signal is received, it will be transformed by an Analog to Digital Converter (ADC) into another electric current signal; and The keyboard controller 50 is to verify a voltage level of the detection circuit; the voltage level can be concluded by calculation after an electric current signal is received by applying the formula of V=IR to come out consumed voltage for management.

Figure 3:
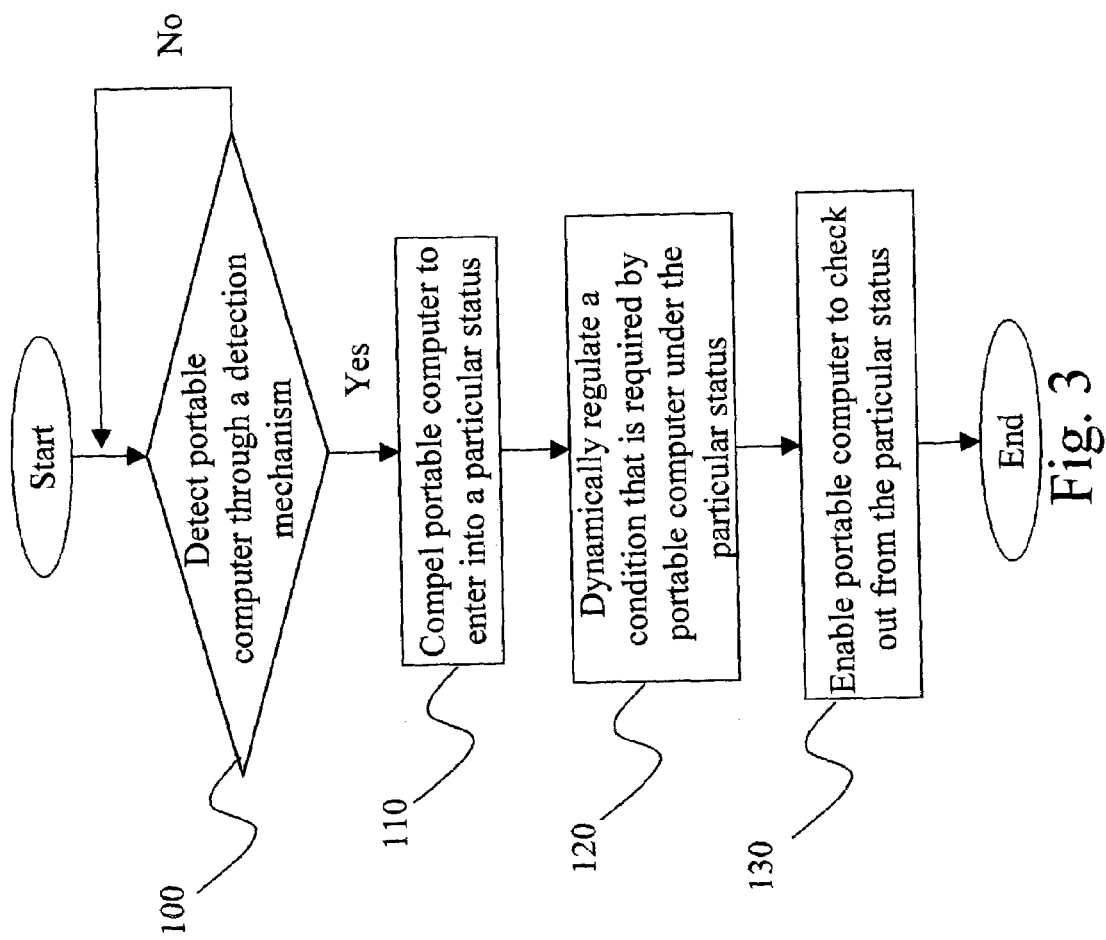
FIG. 3 is a flowchart of the power management method of portable computer of the invention.

All the flows of the invention are depicted as follows. FIG. 3 shows the flowchart of the power management method of portable computer of the invention.

Figure 2:
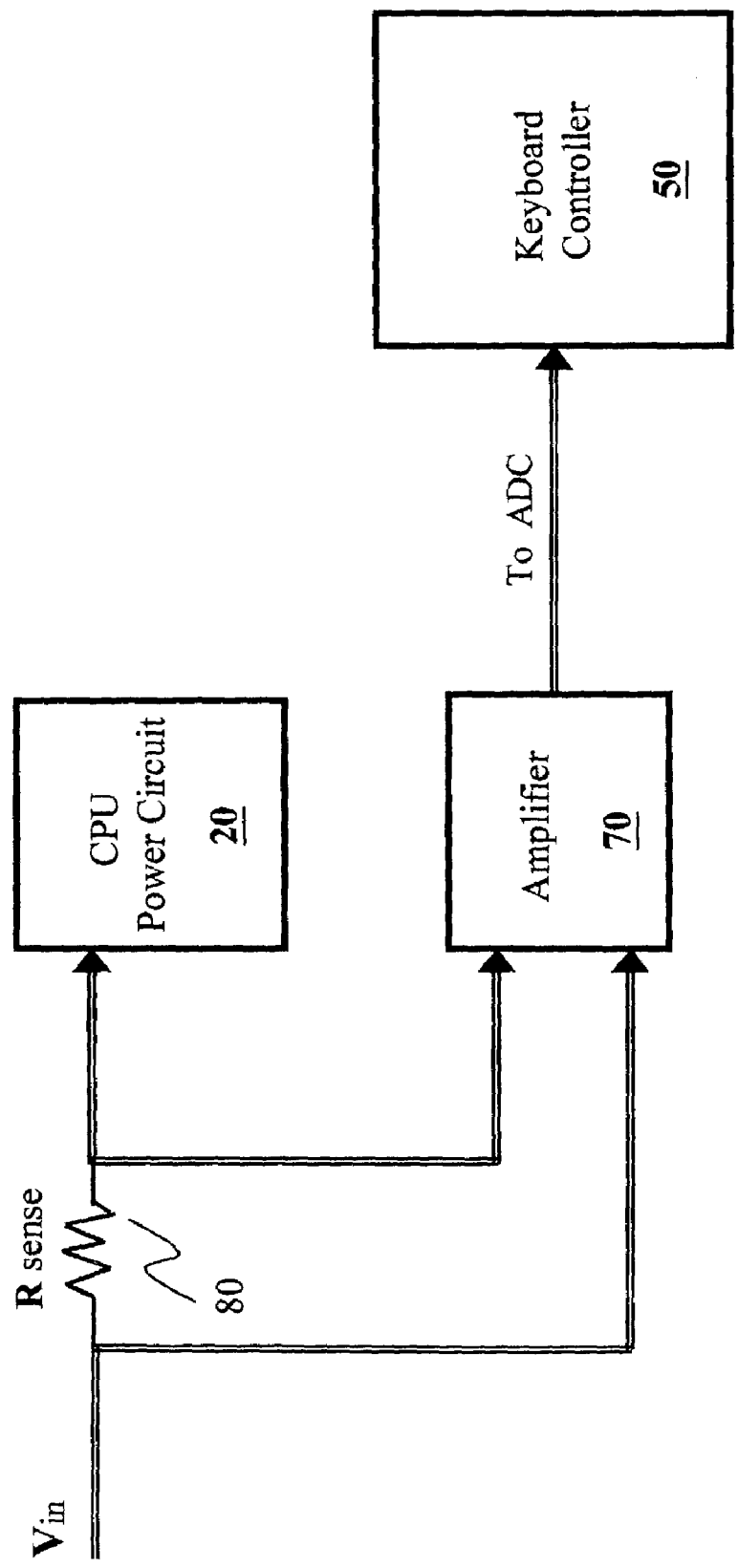
FIG. 2 is a circuit diagram of the detection mechanism of the power management method of portable computer of the invention.

First, the detection mechanism detects the situation of portable computer (step 100); the circuit diagram of the detection mechanism in FIG. 2 is previously described and will not be further detailed. The step 100 provides at least one detection method for verifying the timing for dynamically modifying portable computer; in addition, the detection mechanism can detect the electric current statuses of both charge adapter and battery output, also the CPU 30 utilization. As long as the results of detection are as normal as usual, the detection status keeps up; otherwise, the portable computer is compelled to enter into a particular status (step 110); the particular status can be a state C2 proposed by ACPI, i.e., the CPU 30 STP_GRAND state, which enables CPU 30 to terminate all operations, instead of being interrupted while entering into any event. The particular status can also be a suitable time point for any operation of portable computer to allow the system detects and dynamically modifies the status. The detail of step 110 is described in FIG. 4. Consequently, a condition that is required by portable computer under the particular status is dynamically modifies (step 120); the same as step 110, the detail of step 120 is described later referring to FIG. 4. The condition can be CPU frequency and voltage of portable computer; the frequency refers to External Clock of CPU 30, also can be the frequency and efficacy of a VGA card in portable computer, or a frequency of memory of portable computer. When the condition modification is dynamically completed, the flow enables portable computer to check out from the particular status (step 130).

Figure 4:
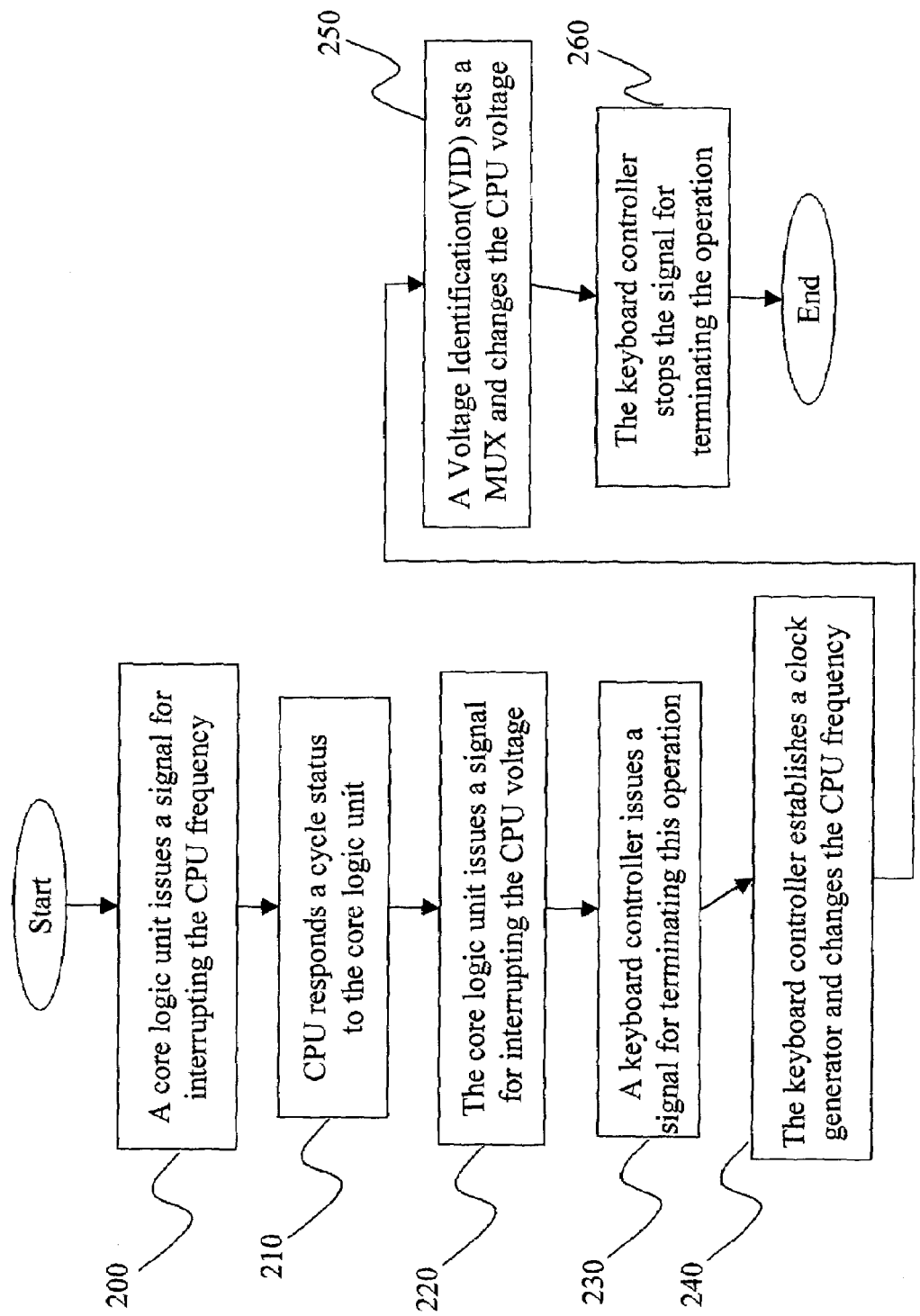
FIG. 4 is a flowchart of CPU electric power management of the invention.

With reference to FIG. 4, the flowchart of CPU electric power management of the invention is described as follows.

According to the above description, the step 110 of compelling portable computer to enter into a particular status further comprises: firstly, issuing a signal for interrupting the frequency of CPU 30 through a core logic unit (step 200); the signal for interrupting the CPU frequency can be a SB_STPCLK#. After the signal is issued, CPU 30 responds a cycle status to the core logic unit 40 (step 210) (please also refer to FIG. 1). Subsequently, the core logic unit 40 issues a signal for interrupting the voltage of CPU 30 (step 220), the signal for interrupting the voltage of CPU 30 can be a CPU_STP#. A keyboard controller 50 then issues a signal for terminating the operation (step 230), the signal for terminating the operation is to assure that CPU 30 keeps up the status of state C2 without being waken up by any interruption of the system; in addition, the signal can be a EC_STPCLK#. The keyboard controller 50 then establishes a clock generator 60 and changes the frequency of CPU 30 (step 240); besides, sets a MUX 10 and changes the voltage of CPU 30 through a VID (step 250). Once all changes are completed, the keyboard controller 50 then finally stops the signal for terminating the operation (step 260) to end up the flow herein.

The said cycle status means that CPU 30 issues a command of hardware control to be properly interpreted and verified by the core logic unit 40, so that the condition (e.g., the voltage and frequency of CPU, the frequency and efficacy of VGA Card, the frequency of Memory) mentioned at step 120 can be further changed.

The clock of CPU 30 can be programmed by the said clock generator 60 through either SM Bus, or General Purpose Input Output (GPIO).

Figure 5:
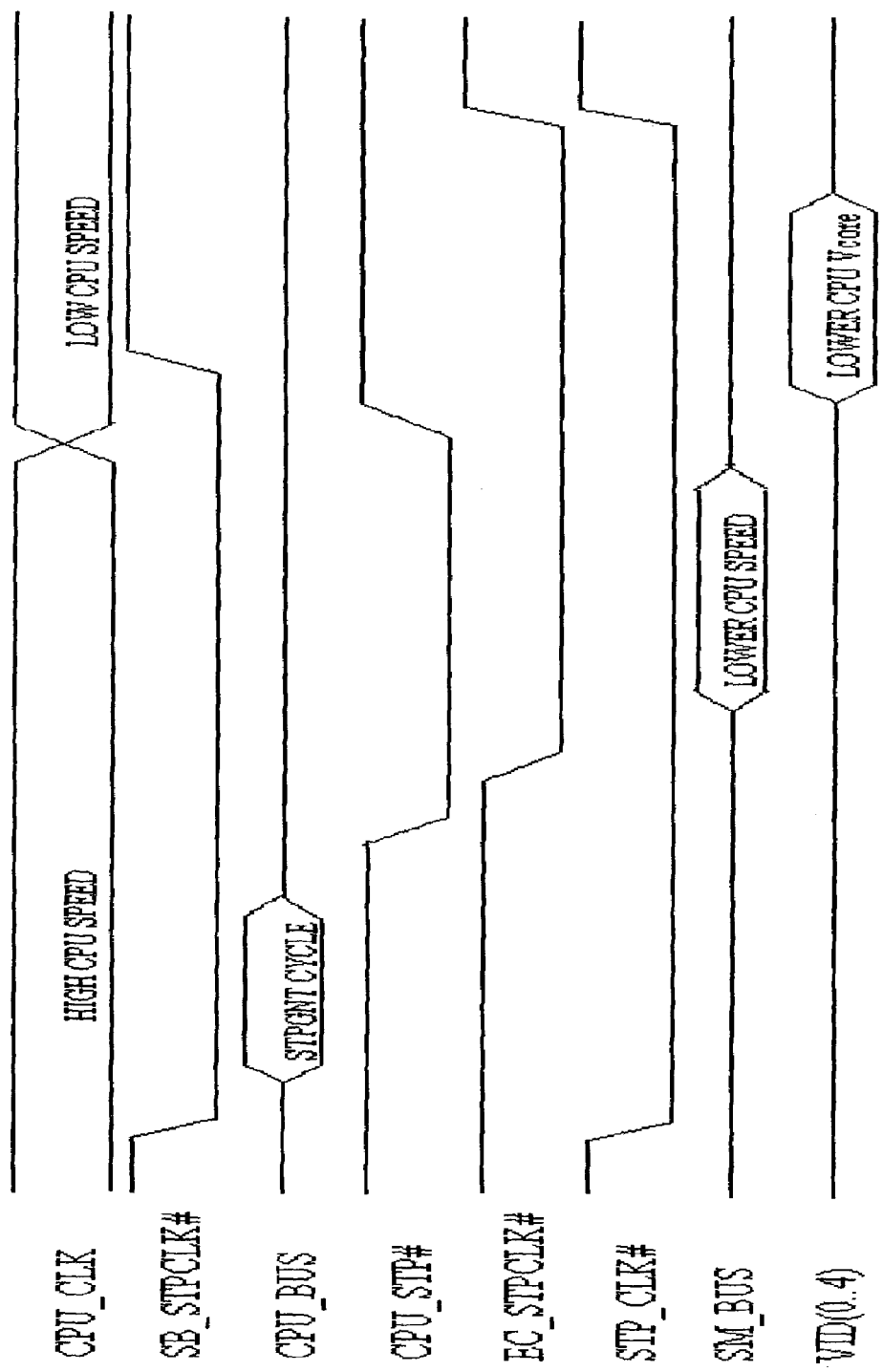
FIG. 5 is a timing chart of the power management method of portable computer of the invention.

The flows for respectively depicting the above processes of the invention can be referred to FIG. 5, the timing chart of the power management method of portable computer of the invention.

Prior to the frequency and voltage changes of CPU 30, the system has to enable CPU 30 to enter into state C2, and follow the steps below, (a) the first step is to design and enable the core logic unit 40 to issue a SB_STPCLK#;
(b) once CPU 30 receives the SB_STPCLK#, it then responds a signal for stopping grant cycle to a STPGNT CYCLE in CPU_BUS;
(c) the core logic unit 40 then confirms the signal of stopping grant cycle and issues the signal of CPU_STP# to inform External Circuitry, i.e. the input device, which is controlled by the keyboard controller 50, CPU 30, enters into state C2;
(d) once the core logic unit 40 issues the CPU_STP#, the keyboard controller 50 then issues a EC_STPCLK# signal. The purpose of the step mainly ensures that CPU 30 can keep up the state C2 without being interrupted by any system event;
(e) the frequency and voltage of CPU 30 can be adjusted at this stage, the keyboard controller 50 then starts to establish the clock generator 60 for changing the frequency of CPU 30 through either SM Bus or GPIO; where VID starts to set a MUX circuit for changing the voltage of CPU 30.
(f) the last step is that the keyboard controller 50 stops the EC_STPCLK# the signal to enable CPU 30 to check out of state C2 and back to the normal status.

The invention also proposes an electric power management classification method of CPU to enable a user to directly adjust the voltage and frequency of portable computer through at least a state. Prior to the discussion of FIG. 6, we shall first define what kinds of system events will enable portable computer to enter one of the classifications of electric power management.

First, the battery usage by a portable computer: most of the users hopes to prolong the battery usage of their portable computers, therefore, when the charge adapter is removed, the battery mode of the invention can help to achieve the object of prolonging the battery usage time.

The second, the load of CPU 30: the load of CPU 30 can be an Indicator to inform a user if the maximum efficacy of CPU 30 is required at all times, so that the efficacy of CPU 30 can be reduced during the light load period.

The third, CPU 30 is at hibernating mode: as CPU 30 does not operate at all times, the operation system of Microsoft Windows proposes a ACPI to inform the system of entering into a hibernating mode. Under the mode, the system will compel CPU 30 to save much more electric power.

The forth, temperature event: when the temperature status of portable computer almost exceeds the ranges of safety spec. thereof (the safety ranges for all components), electric power of CPU 30 shall be reduced to assure computer is within the safety temperature range.

The fifth, electric power event: when the electric power status of portable computer almost exceeds the range of safety spec. thereof (the safety ranges for all components, e.g., battery, charging outlet, etc.), the voltage of CPU 30 shall be reduced to assure computer is within the safety electric power range.

Figure 6:
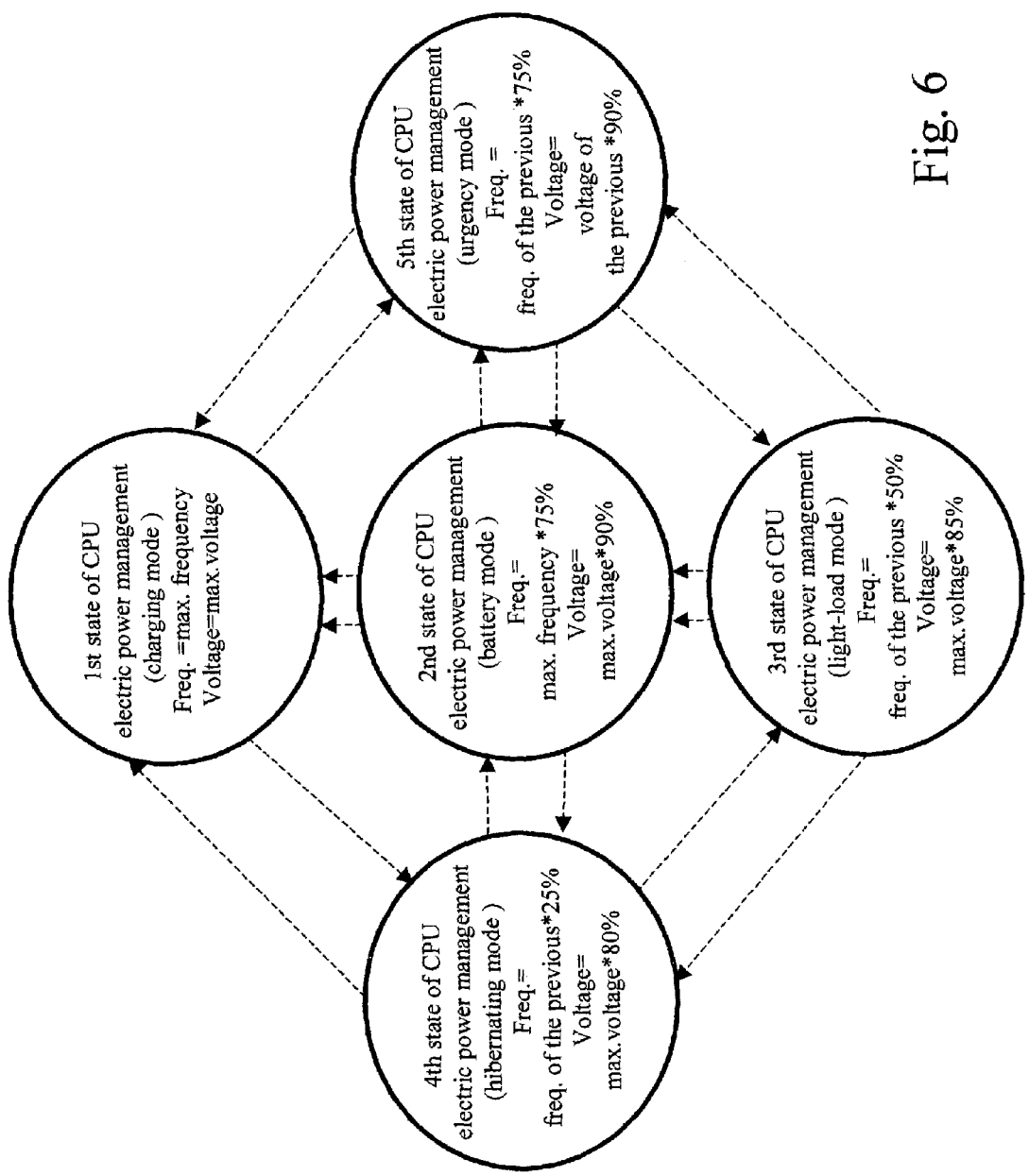
FIG. 6 is a flowchart of CPU electric power management classification method of the power management method of portable computer of the invention.

With reference to FIG. 6, the flowchart of CPU electric power management classification method of the power management method of portable computer of the invention is further depicted as follows.

First of all, the 1st state of CPU electric power management is a charging mode, the frequency of the mode is the maximum frequency of the system; where the voltage thereof to be the maximum voltage of the system. Portable computer enters the mode while it is using a charge adapter.

The 2nd state of CPU electric power management is a battery mode, the frequency of the mode is 75% of the maximum frequency of the system; where the voltage thereof to be 90% of the maximum voltage of the system. Portable computer enters the mode while the electric power thereof is provided by battery.

The 3rd state of CPU electric power management is a light-load mode, the frequency of the mode is one-half of the frequency of the previous mode; where the voltage thereof to be 85% of the maximum voltage of the system. CPU enters the mode while it only needs lower efficacy, such as the said load of CPU 30.

The 4th state of CPU electric power management is a hibernating mode, the frequency of the mode is a quarter of frequency of the previous mode; where the voltage thereof to be 80% of the maximum voltage of the system. The system enters the mode while it idles for a period of time, such as the said load of CPU 30.

The 5th state of CPU electric power management is an urgency mode; the frequency of the mode is three-quarter of the frequency of the previous mode; where the voltage thereof is 90% of the voltage of the previous mode. Portable computer enters this mode, while it is almost close to the safety requirement of the Spec., such as the said temperature, or electric power events etc.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A power management method of portable computer is applied to portable computer through adjusting an operating frequency and voltage; this method comprises the following steps, detecting portable computer through a detection mechanism, the detection mechanism including a circuit to detect current supplied to a central processing unit (CPU) of the portable computer that includes:
(a) a sense register coupled to a CPU power circuit for detecting an electric current load of the CPU and sending out an electric signal responsive thereto;
(b) an amplifier coupled to the sense register to magnify a voltage drop between two ends of the sense register and transform the received electric current signal into a digital electric current signal through an Analog to Digital Converter (ADC); and
(c) a keyboard controller coupled to the amplifier to verify a voltage level of the detection circuit, the voltage level being calculated subsequent to the electric current signal being received;

compelling portable computer to enter a particular status;
dynamically modifying a condition that is required by portable computer under a particular status; and enabling portable computer to check out of the particular status.

2. The power management method of portable computer of the invention in accordance with claim 1, wherein the step of detecting portable computer through a detection mechanism provides at least one detection method for verifying a suitable time to dynamic modifying a required condition by the portable computer.

3. The power management method of portable computer of the invention in accordance with claim 1, wherein the detection mechanism can be of a Detecting Charge Adapter, which can sense electric current statuses of battery output.

4. The power management method of portable computer of the invention in accordance with claim 1, wherein the detection mechanism can be a detector of status of CPU Utilization.

5. A power management method of portable computer of the invention in accordance with claim 1, wherein the particular status can be a state C2, which is proposed by an Advanced Configuration and Power Interface(ACPI) indicating the CPU STP_GRAND state.

6. The power management method of portable computer of the invention in accordance with claim 1, wherein the particular status, which enables the CPU to terminate all operations, and won't be interrupted by any event.

7. The power management method of portable computer of the invention in accordance with claim 1, wherein the particular status can be a suitable time point during any operation of portable computer.

8. The power management method of portable computer of the invention in accordance with claim 1, wherein the step of compelling portable computer to enter a particular status further comprising the following steps, sending a signal for interrupting the frequency of CPU through a core logic unit;

responding a cycle status to the core logic unit by the CPU;

sending a signal for interrupting the voltage of CPU by the core logic unit; and sending a signal for terminating the operation by a keyboard controller.

9. The power management method of portable computer of the invention in accordance with claim 8, wherein the signal for interrupting the frequency of CPU can be a SB_STPCLK#.

10. The power management method of portable computer of the invention in accordance with claim 8, wherein the signal for interrupting the voltage of CPU can be a CPU_STP#.

11. The power management method of portable computer of the invention in accordance with claim 8, wherein the signal for terminating the operation is to ensure CPU to continuously stay at the particular status without being waken up by any system interruption; in addition, the signal for terminating the operation can be an EC_STPCLK#.

12. The power management method of portable computer of the invention in accordance with claim 1, wherein the condition can be a CPU frequency and voltage of portable computer; besides, the CPU is a DESK TOPCPU of desktop PC.

13. The power management method of portable computer of the invention in accordance with claim 1, wherein the condition can be the frequency of memory of the portable computer.

14. The power management method of portable computer of the invention in accordance with claim 1, wherein the condition can be the frequency and efficacy of a Video Graphics Array( VGA) card in the portable computer.

15. The power management method of portable computer of the invention in accordance with claim 1, wherein the step of dynamically modifying a condition that is required by portable computer under the particular status further comprising the following steps, establishing a clock generator and changing the frequency of CPU by a keyboard controller; and setting a MUX and changing the voltage of CPU through a Voltage Identification(VID).

16. The power management method of portable computer of the invention in accordance with claim 1, wherein the step of enabling portable computer to check out of the particular status is to stop a signal for terminate the operation through a keyboard controller; the signal for terminating the operation can be a EC_STPCLK#.

* * * * *